United States Patent
Harada et al.

(10) Patent No.: US 6,754,444 B2
(45) Date of Patent: Jun. 22, 2004

(54) CAMERA WITH VIBRATION ISOLATION FUNCTION

(75) Inventors: Yasuhiro Harada, Kanagawa (JP); Toshiharu Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/243,237

(22) Filed: Sep. 12, 2002

(65) Prior Publication Data

US 2003/0053802 A1 Mar. 20, 2003

(30) Foreign Application Priority Data

Sep. 20, 2001 (JP) ........................................ 2001-286003

(51) Int. Cl.[7] .............................................. G03B 17/00
(52) U.S. Cl. ........................................... 396/52; 396/55
(58) Field of Search ............................. 396/52–55, 246

(56) References Cited

U.S. PATENT DOCUMENTS 5,771,404 A * 6/1998 Katayama et al. ............ 396/52

FOREIGN PATENT DOCUMENTS

JP 06347856 A * 12/1994 ............ G03B/7/08

* cited by examiner

Primary Examiner—Russell Adams
Assistant Examiner—Arthur A Smith
(74) Attorney, Agent, or Firm—Robin, Blecker & Daley

(57) ABSTRACT

There is disclosed a camera including a correcting optical unit for correcting a camera movement, a calculation circuit for calculating a drive target value of the camera movement correcting optical unit based on a camera movement signal, a computation circuit for computing a light exposure amount to a storage medium, and an exposure amount control unit for, even if the drive target value exceeds a drive threshold amount of the camera movement correcting optical unit during an exposure operation for the storage medium, continuing exposure to the storage medium until it reaches the light.

14 Claims, 4 Drawing Sheets

CAMERA WITH VIBRATION ISOLATION FUNCTION

BACKGROUND OF THE INVENTION

1. Field of the Invention

The present invention relates to improvement in a camera having camera movement correcting means.

2. Related Background Art

A camera movement in photographing is usually a vibration of 1 Hz to 10 Hz. As a basic idea of a vibration isolation apparatus allowing a photograph to be taken with no blurring even on occurrence of such a camera movement on a release of a shutter, the vibration of the camera due to the camera movement must be detected and a correcting lens must be displaced according to a detected value thereof. Accordingly, in order to take a photograph with no blurring even on occurrence of the camera movement, it is necessary to correctly detect the vibration of the camera first and to correct a change in an optical axis due to the camera movement secondly.

This detection of the vibration (camera movement) can be performed, in principle, by mounting on the camera a detection sensor for detecting acceleration, angular acceleration, angular velocity, angular displacement and so on and camera movement correcting means having a calculation portion for appropriately calculating output thereof to correct the camera movement. And based on this detection information, the image blurring is controlled by driving the camera movement correcting means for changing a photographing optical axis.

In such a prevention system, a desired vibration isolation effect can no longer be obtained in the case where a drive amount of the camera movement correcting means corresponding to a camera movement amount detected by camera movement detection means exceeds a drive threshold amount, since the camera movement correcting means can no longer follow a displacement amount necessary for camera movement correction. As for this problem, Japanese Patent Application Laid-Open No. 06-347856 discloses the camera which finishes exposure when the camera movement exceeding the drive threshold amount of the camera movement correcting means is detected during photographing and elapse of time from start of the exposure is within a predetermined value to a proper exposure value.

However, in the case of a system, such as the vibration isolation system of a compact camera required to be small-sized, of which drive amount of the camera movement correcting means does not have sufficient allowance, performance of the above exposure control in the past renders it more frequent to exceed the drive threshold amount of the camera movement correcting means. Accordingly, on performing the exposure control of the above proposal wherein the exposure is immediately finished if it exceeds the drive threshold amount of the camera movement correcting means in a state of having finished the exposure within a predetermined value to the proper exposure value, there is a possibility that there may frequently arise scenes of so called insufficient exposure in which an exposure tolerance limit can be secured but the desired exposure value cannot be reached or many scenes in which the exposure tolerance limit is reached but the camera movement occurs.

SUMMARY OF THE INVENTION

A first object of the present invention is to provide a camera capable of expanding an area for obtaining a vibration isolation effect.

A second object of the present invention is to provide a camera capable of expanding an area for obtaining a vibration isolation effect and an area for obtaining a proper exposure value so as to allow a photographing range for a photographer to obtain an intended photograph to be expanded.

And the present invention is characterized by the camera including:

a correcting optical unit for correcting a camera movement;

a calculation circuit for calculating a drive target value of the above described camera movement correcting optical unit based on a camera movement signal;

a computation circuit for computing a light exposure amount to a storage medium; and exposure amount control means for, even if the above described drive target value exceeds a drive threshold amount of the above described camera movement correcting optical unit during the exposure operation for the storage medium, continuing exposure to the above described storage medium until it reaches the light exposure amount computed by the above described computation circuit in the case where a difference between the above described drive target value and the above described drive threshold amount is a predetermined amount or less, and on the other hand, stopping light exposure to the above described storage medium in the case where the difference exceeds the above described predetermined amount.

In particular, the above described computation circuit computes an exposure amount based on luminance information of an object, lightness of a photographing optical system and sensitivity of the storage medium.

In addition, the above described the drive threshold amount indicates a mechanical end of the above described correcting optical unit.

In addition, the above described predetermined amount is changed according to a zoom position of the photographing optical system.

In addition, the above described predetermined amount is changed according to a stop value of the photographing optical system.

In addition, the above described exposure amount control means stops the light exposure to the above described storage medium after predetermined time elapses even in the case where the difference exceeds the above described predetermined amount.

Or the camera including:

the correcting optical unit for correcting the camera movement;

the calculation circuit for calculating the drive target value of the above described camera movement correcting optical unit based on the camera movement signal;

the computation circuit for computing the light exposure amount to the storage medium; and the exposure amount control means for, even if the above described drive target value exceeds the drive threshold amount of the above described camera movement correcting optical unit during the exposure operation for the storage medium, continuing the exposure to the above described storage medium until it reaches the light exposure amount computed by the above described computation circuit in the case where the difference between the above described drive target value and the above described drive threshold amount is the predetermined amount or less, and on the other hand, stopping light exposure to the above described storage medium in the case where the predetermined time elapses after the difference exceeded the predetermined amount.

DESCRIPTION OF THE PREFERRED EMBODIMENTS

Figure 1:
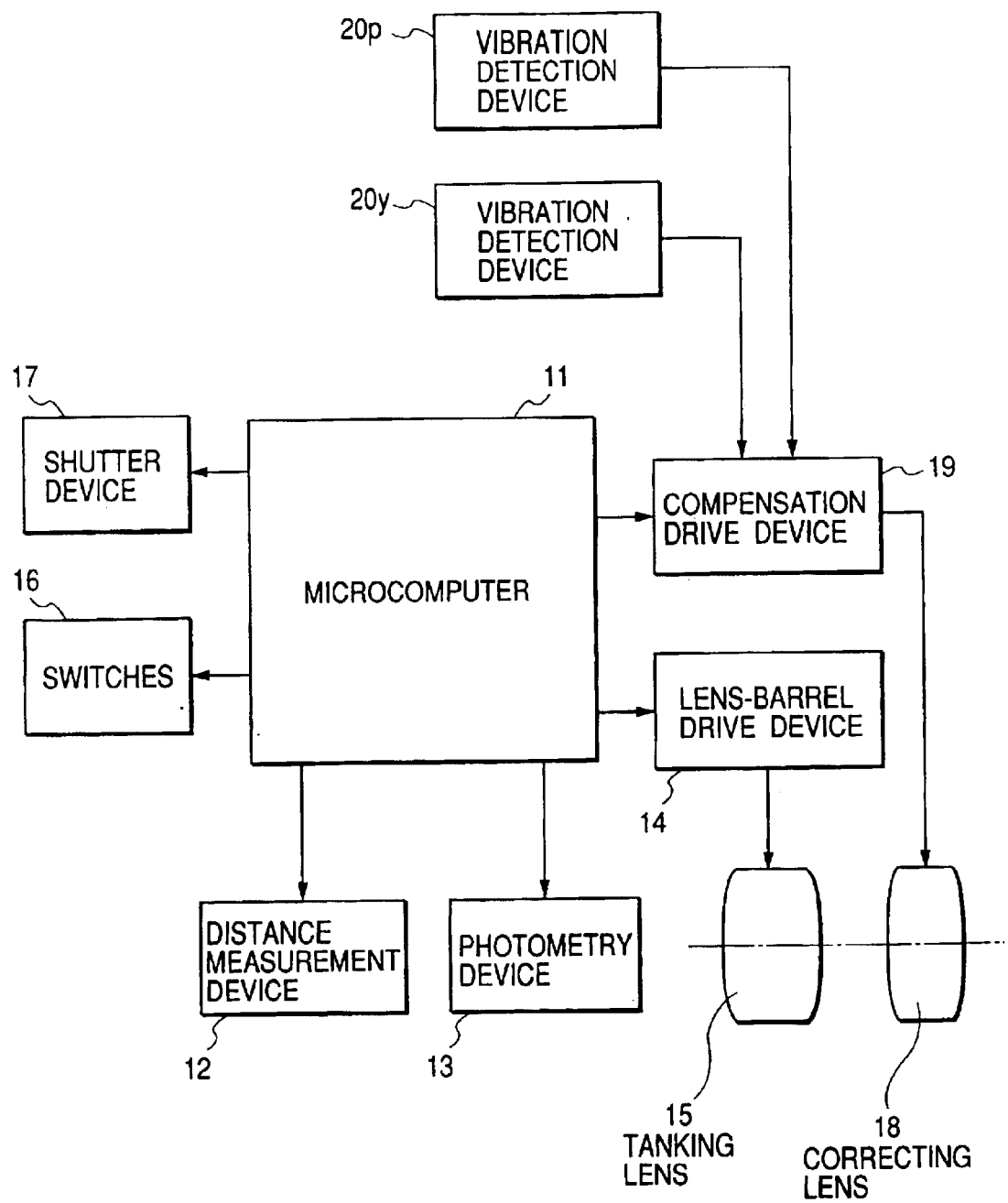
FIG. 1 is a block diagram showing major portions of a camera related to a first embodiment of the present invention.

Hereafter, the present invention will be described in detail based on embodiments shown in the drawings.

FIG. 1 is a block diagram showing major portions of a camera related to a first embodiment of the present invention.

In this drawing, reference numeral 11 denotes a microcomputer for performing control and calculation related to various photographing operations, 12 denotes a distance measurement device for measuring a distance from a camera to a major object, 13 denotes a photometry device for measuring object luminance information. Reference numeral 14 denotes a lens-barrel drive device for performing focal length variance (zoom) and focal control (focusing) of a lens barrel including a taking lens 15. Reference numeral 16 denotes switches comprised of a photographing preparation start switch (hereafter, referred to as a switch SW1), an exposure start switch (hereafter, referred to as a switch SW2), a focal length variance switch (hereafter, referred to as a switch ZSW), a focal length detection switch (hereafter, referred to as a switch ZPSW), a film sensitivity detection switch (hereafter, referred to as a switch ISOSW) and so on.

Reference numeral 17 denotes a shutter device, wherein open/close control (exposure control) is performed based on film sensitivity, lightness of the taking lens (F value) and exposure time obtained from the object luminance information from the photometry device 13. Reference numeral 18 denotes a correcting lens which is a correcting optical system vertically mobile to an optical axis, and 19 denotes a correcting drive device for driving the correcting lens 18, which constitutes the camera movement correcting means together with the above described correcting lens 18.

Reference numerals 20p and 20y denote vibration detection devices which are camera movement detection means such as an angular velocity sensor for detecting movements of a horizontal axis surroundings (pitch) and a vertical axis surroundings (yaw) of the camera. The movements detected by the vibration detection devices 20p and 20y are converted by the compensation drive device 19 to an amount of motion on a film, that is, drive signals which drive the correcting lens 18 in a direction for correcting the movements.

Next, operations of the major portions of the camera will be described by using a flowchart in FIG. 2.

Figure 2:
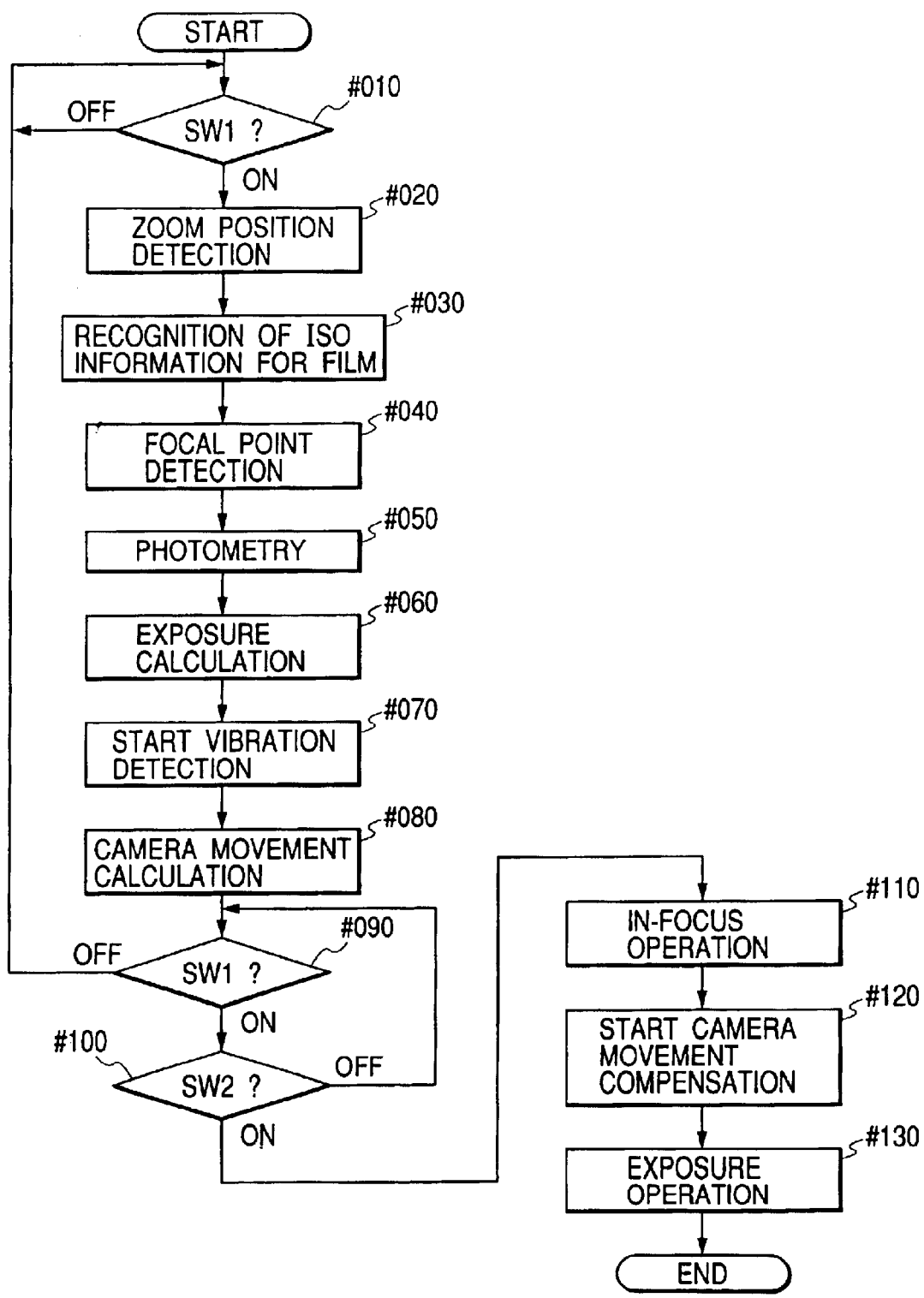
FIG. 2 is a flowchart showing major operations of the camera related to the first embodiment of the present invention.

If the flow in FIG. 2 starts, the microcomputer 11 repeats step #010 until a switch operation is performed, and proceeds to step #020 when a first stroke of a release button is pushed and the switch SW1 in the switches 16 is turned on.

In step #020, the state of the switch ZPSW in the switches 16 is detected to recognize a current zoom position (focal length information)=Zp so as to store recognition information of this Zp in a predetermined area of an unshown memory in the microcomputer 11 and also store the recognition information on F value information according to the focal length of the photographing optical system therein in a predetermined area of an unshown memory in the microcomputer 11. In the next step #030, the state of the switch ISOSW in the switches 16 is detected to detect sensitivity information on a loaded film so as to store the sensitivity information on the film in a predetermined area of an unshown memory in the microcomputer 11.

In the next step #040, the distance measurement device 12 is driven, a known distance measurement operation is performed, and object distance information is stored in the predetermined area of the unshown memory in the microcomputer 11. In a subsequent step #050, the photometry device 13 is driven, a known photometric operation is performed, and object luminance information is stored in the predetermined area of the unshown memory. And in step #060, known exposure calculation for determining exposure information such as exposure time and a stop is performed based on the distance measurement information obtained in the above step #040, the photometric information obtained in the above step #050, the F value information obtained in the above step #020, the film sensitivity information obtained in the above step #030 and so on.

In the next step #070, a current is passed through each angular velocity sensor, for instance, constituting the vibration detection devices 20p and 20y, and vibration detection is started. And in the next step #080, output from the vibration detection devices 20p and 20y is converted into a drive target value B (a blurring amount on a film surface) of the camera movement correcting means by the correcting drive device 19 with the output and zoom position information from the vibration detection devices 20p and 20y.

In step #090, the state of the switch SW1 in the switches 16 is detected. If the switch is on, it moves on to step #100, and if the switch is off, it moves on to step #010.

At the time of proceeding to step #100, the state of the switch SW2 in the switches 16 is detected here. If the switch is not on, it returns to step #90, and if the switch is on, it moves on to step #110 where a lens barrel drive (focusing) is performed by the lens-barrel drive device 14 based on a focal control amount (focal drive amount) acquired by the known calculation. And in the next step #120, the correcting lens 18 is driven to start camera movement correction, and in step #130, an exposure operation accompanied by a camera movement correcting operation is performed by the shutter device 14 based on the exposure information obtained in the above step #60.

Next, the exposure operation accompanied by the camera movement correcting operation performed in step #130 in FIG. 2 described above will be described in detail by referring to the flowchart in FIG. 3.

If the exposure operation starts, an operation for opening a shutter is performed to start the exposure in step #111. And in the next step #112, it is determined whether or not the drive target value B of the camera movement correcting means (correcting lens 18) from the correcting drive device 19 is exceeding a drive threshold amount Blim of the camera movement correcting means. Here, the drive threshold amount Blim is equivalent to a limit of a mechanical stroke of the camera movement correcting means, and is also equivalent to a maximum value of an image surface motion amount on the film surface when driving the camera movement correcting means.

In the case where it is determined that the drive threshold amount Blim is not exceeded in the above step #112, the operation moves to step #116, where the exposure is continued until it becomes adequate exposure (#112→#116→#112 . . . ).

In addition, in the case where it is determined that the drive threshold amount Blim is exceeded in the above step #112, the operation moves to step #113, where the correcting lens 18 is held at the position of the drive threshold amount Blim in the range wherein the drive target value B is the Blim or more in order to prevent the camera from being damaged by moving the correcting lens 18 over the drive threshold amount. And in the next step #114, it is examined whether or not the drive target value B is a predetermined value Bth or more so as to determine whether or not to continue the exposure.

Here, the predetermined value Bth is set, as the image surface motion amount on the film surface, at a value larger than the Blim which is equivalent to the drive threshold amount of the camera movement correcting means (correcting lens 18). The predetermined value Bth is set at a value larger than the drive threshold amount Blim because a permissible circle of confusion is a few tens of $\mu m$ such as 40 $\mu m$ or so in the case of a compact camera for instance, and a camera movement of 40 $\mu m$ or so as the image surface motion amount on the film surface can be permitted even if it is impossible to make a correction. Accordingly, the predetermined value Bth is determined, by the following expression, to be able to permit more image surface motion amount on the film surface than the drive threshold amount Blim, such as a value larger by 40 $\mu m$.

$$Bth=Blim+40 \ \mu m$$

In the case where it is determined that the output from the camera movement calculation devices 21$p$ and 21$y$ is Bth or less in the above step #114, it is the area in which vibration isolation effects of the camera movement correcting means can be sufficiently obtained, so that the operation moves to step #116, continues the exposure until it becomes the adequate exposure, and moves on to step #115 when it becomes the adequate exposure, and then closes the shutter so as to finish the exposure operation and also finish the photographing operation.

In addition, in the case where it is determined that the drive target value B is the Bth or more in the above step #114, continuation of the exposure does not allow the vibration isolation effects to be sufficiently obtained and causes the photo to be blurred, so that the shutter is closed in step #115 to finish the exposure operation and also finish the photographing operation.

Thus, according to this embodiment, in the case where the amount of the camera movement exceeds the drive threshold amount of the camera movement correcting means, the exposure is continued to the extent that the exceeding amount is in the range permissible as an unblurred photo in the image surface motion amount on the film surface (#114→#116), so that it is possible to obtain the photo benefiting from the vibration isolation effects in a larger area.

Moreover, according to this embodiment, while the predetermined value Bth for determining whether or not to continue the exposure is fixed, a photographing resolution of a lens and performance of an optical system change according to the zoom position of the camera and the stop thereof, and so the amount of the camera movement permissible as the image surface motion amount on the film surface also changes accordingly. Therefore, a desired configuration is the one wherein the predetermined value Bth is changed as appropriate according to the stop and zoom position of the camera.

(Second Embodiment)

Figure 4:
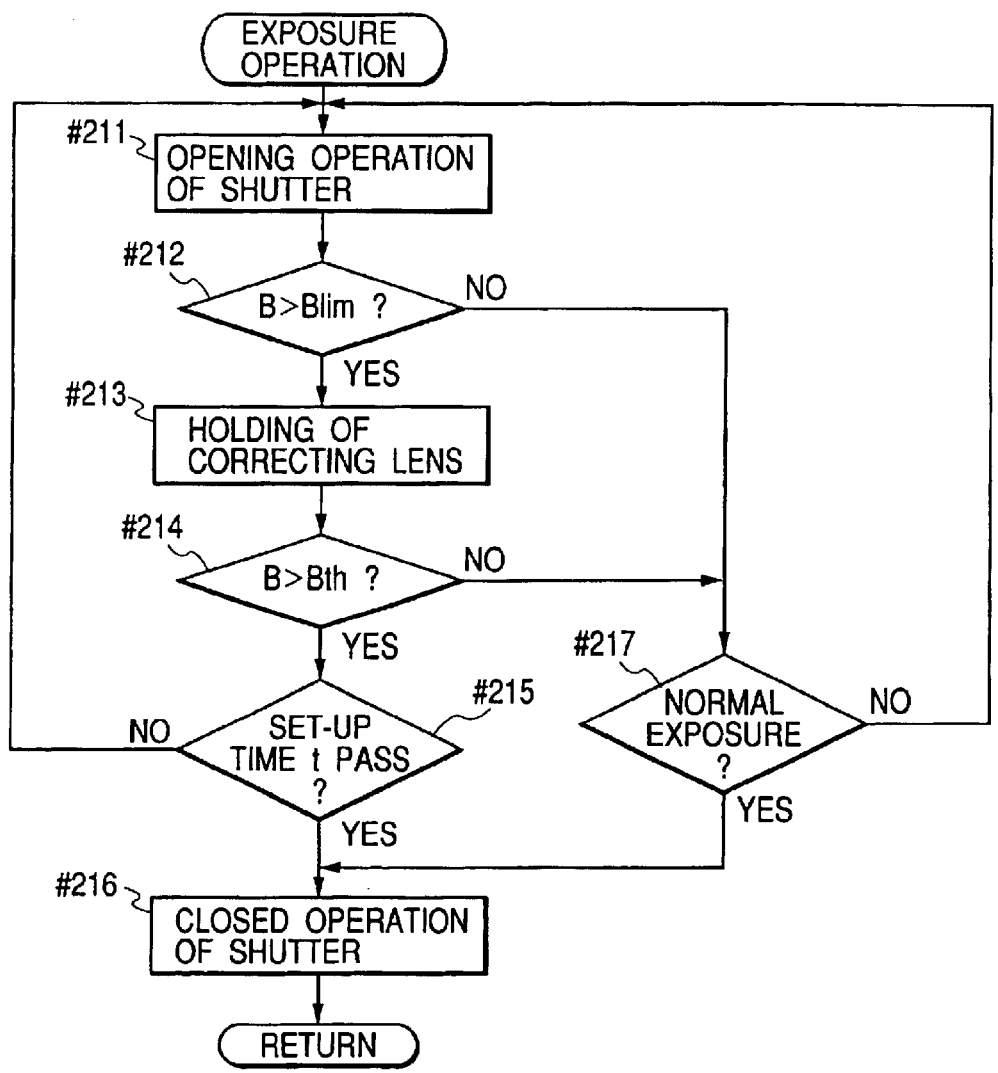
FIG. 4 is a flowchart showing the exposure operation accompanied by the vibration isolation operation of the camera related to the first embodiment of the present invention.

FIG. 4 is a flowchart for describing the exposure operation which is the major portion related to a second embodiment of the present invention. The configuration of the camera and major photographing sequences are the same as the above embodiment 1, and so description thereof will be omitted.

In FIG. 4, if the exposure operation starts, the shutter is opened and the exposure is started in step #211. And in the next step #212, it is examined whether or not the drive target value B is exceeding the drive threshold amount Blim of the camera movement correcting means. As a result thereof, in the case where it is determined that the drive threshold amount Blim is not exceeded, the operation moves to step #217 to continue the exposure until it becomes the adequate exposure (#212→#217→#212 . . . ).

In addition, in the case where it is determined that the drive threshold amount Blim is exceeded in step #212, it moves on to step #213, where the correcting lens 18 is held at the position of the drive threshold amount Blim of the camera movement correcting means in order to prevent the camera from being damaged by moving the correcting lens 18 over the drive threshold amount.

Next, in step 214, it is determined whether or not the output of the camera movement calculation devices 21$p$ and 21$y$ (drive target value) B is larger than the aforementioned predetermined value Bth. In the case where it is determined that the output B is the Bth or less, the operation moves to step #217, where it is determined whether or not it is the adequate exposure, and the operation moves to step #216 when it becomes the adequate exposure, and then closes the shutter so as to finish the exposure operation. On the other hand, in the case where the operation has not reached the adequate exposure, the operation returns to step #212 to continue the exposure operation.

In addition, in the case where it is determined that the drive target value B is larger than the Bth in the above step 214, the operation moves to step #215, where a period by which the drive target value B exceeds the predetermined value Bth is measured so as to determine whether or not the exceeding period is a predetermined period t or longer. Here, the predetermined period t is a value sufficiently small against the exposure time for the adequate exposure, and it is set at the value which is one tenth to the exposure time for the adequate exposure for instance. In the case where the predetermined period t elapsed in step #215, the operation moves to step #216 and then closes the shutter so as to finish the exposure operation. In addition, in the case where the exceeding period is shorter than the predetermined period t in the above step #215, the operation returns to step #212 to continue the exposure.

According to the exposure control in the second embodiment of the present invention, the exposure operation is continued even if the drive target value B exceeds the predetermined value Bth because the vibration isolation effects are influenced little and not greatly spoiled thereby in the case where the period is sufficiently small against the entire exposure time. Thus, it becomes possible, even if the drive target value B exceeds the predetermined value Bth, to expand the photographing area capable of obtaining the adequate exposure and the vibration isolation effects by continuing the exposure in the case where the period is sufficiently short against the entire exposure time.

Figure 3:
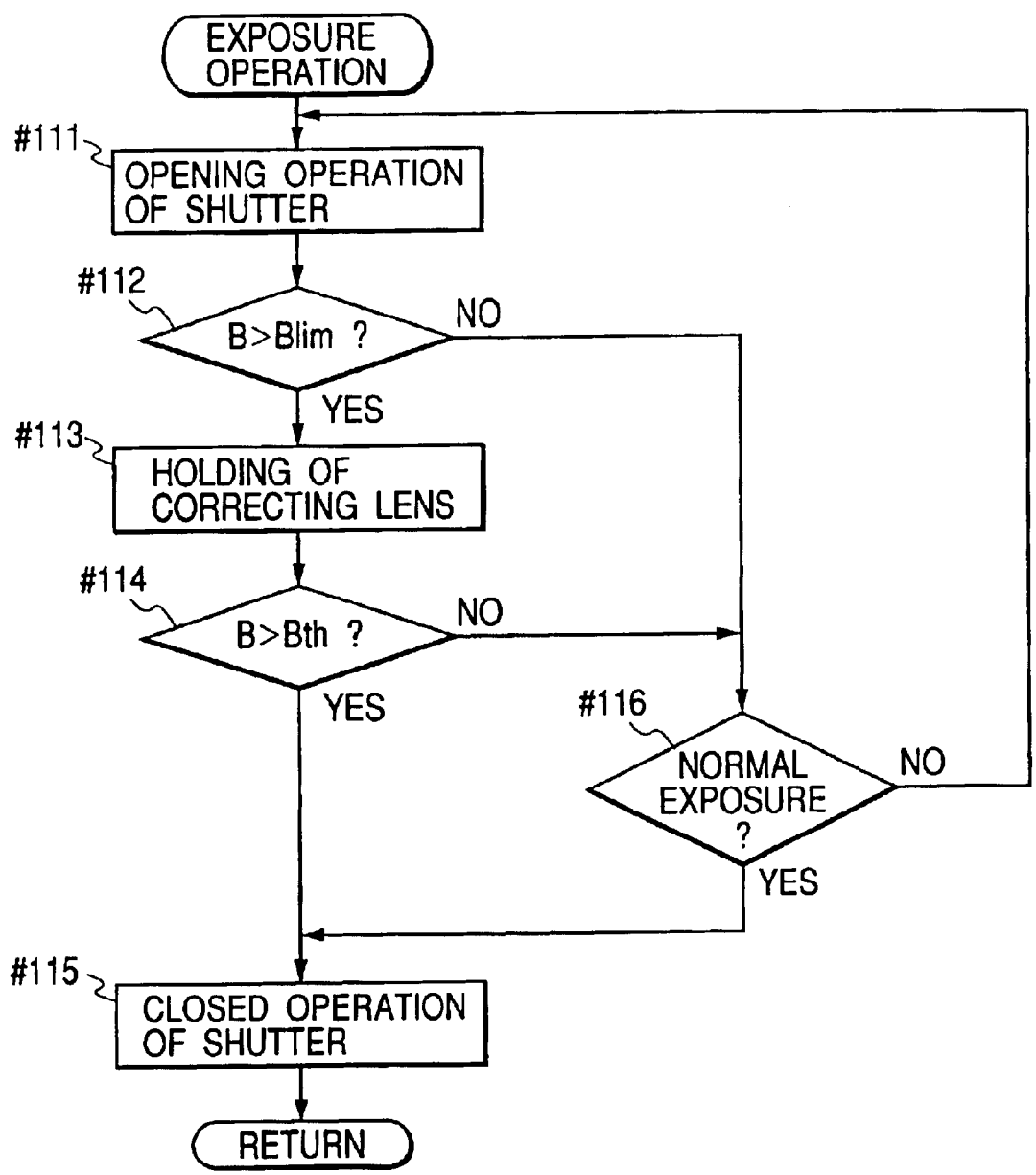
FIG. 3 is a flowchart showing an exposure operation accompanied by a vibration isolation operation of the camera related to the first embodiment of the present invention.

According to the above embodiments, it is possible, even if the drive target value B of the camera movement correcting means exceeds the drive threshold amount Blim thereof during the exposure (YES of step #112 in FIG. 3, YES of step #212 in FIG. 4), to expand the photographing area capable of obtaining the vibration isolation effects, because the above described exposure is continued in the case where the difference between the above described drive target value B and the above described drive threshold amount Blim of the above described correcting means is the predetermined value Bth or less (NO of step #114 in FIG. 3, NO of step #214 in FIG. 4), and it is stopped in the case where the difference is larger than the predetermined value (YES of step #114 in FIG. 3, YES of step #214 in FIG. 4).

Furthermore, it is possible, even if the difference between and the above described drive threshold amount Blim and the above described drive target value B is larger than the predetermined value Bth, to expand the area capable of obtaining the vibration isolation effects and further expand the area capable of obtaining an adequate exposure value so as to expand the photographing area capable of obtaining the photo intended by the photographer, because the exposure is continued in the case where the period exceeding the predetermined value Bth is the predetermined period t or shorter (NO of step #215 in FIG. 4), and it is stopped in the case where the predetermined period elapsed (YES of step #215 in FIG. 4).

As described above, it is possible to provide the camera allowing the photographing area capable of obtaining the vibration isolation effects to be expanded.

In addition, it is possible to provide the camera allowing the area capable of obtaining the vibration isolation effects and the area capable of obtaining the adequate exposure value to be expanded so as to expand the photographing area capable of obtaining the photo intended by the photographer.

What is claimed is:

1. A camera with a vibration isolation function, comprising:
   a correcting optical unit for correcting a camera movement;
   a calculation circuit for calculating a drive target value of said camera movement correcting optical unit based on a camera movement signal;
   a computation circuit for computing a light exposure amount; and
   exposure amount control means for, even if said drive target value exceeds a drive threshold amount of said camera movement correcting optical unit during the exposure operation, continuing exposure until it reaches the light exposure amount computed by said computation circuit in the case where a difference between said drive target value and said drive threshold amount is a predetermined amount or less, and on the other hand, stopping light exposure in the case where the difference exceeds said predetermined amount.

2. The camera according to claim 1, wherein said computation circuit computes an exposure amount based on luminance information of an object and lightness of a photographing optical system.

3. The camera according to claim 1, wherein said drive threshold amount indicates a mechanical end of said correcting optical unit.

4. The camera according to claim 1, wherein said predetermined amount is changed according to a zoom position of a photographing optical system.

5. The camera according to claim 1, wherein said predetermined amount is changed according to a stop value of a photographing optical system.

6. The camera according to claim 1, wherein said exposure amount control means stops the light exposure after predetermined time elapses even in the case where the difference exceeds said predetermined amount.

7. The camera according to claim 1, wherein said predetermined amount is an amount in accordance with a permissible circle of confusion.

8. A camera with a vibration isolation function, comprising:
   a correcting optical unit for correcting a camera movement;
   a calculation circuit for calculating a drive target value of said camera movement correcting optical unit based on a camera movement signal;
   a computation circuit for computing a light exposure amount; and
   exposure amount control means for, even if said drive target value exceeds a drive threshold amount of said camera movement correcting optical unit during the exposure operation, continuing exposure until it reaches the light exposure amount computed by said computation circuit in the case where a difference between said drive target value and said drive threshold amount is a predetermined amount or less, and on the other hand, stopping light exposure in the case where predetermined time elapses after the difference exceeded the predetermined amount.

9. The camera according to claim 8, wherein said computation circuit computes an exposure amount based on luminance information of an object and lightness of a photographing optical system.

10. The camera according to claim 8, wherein said drive threshold amount indicates a mechanical end of said correcting optical unit.

11. The camera according to claim 8, wherein said predetermined amount is changed according to a zoom position of a photographing optical system.

12. The camera according to claim 8, wherein said predetermined amount is changed according to a stop value of a photographing optical system.

13. A method of vibration isolation in a camera, comprising:
   correcting a camera movement with a correcting optical unit;
   calculating a drive target value of said camera movement correcting optical unit based on a camera movement signal;
   computing a light exposure amount; and
   continuing exposure using exposure amount control means, even if said drive target value exceeds a drive threshold amount of said camera movement correcting optical unit during the exposure operation, until it reaches the light exposure amount computed, in the case where a difference between said drive target value and said drive threshold amount is a predetermined amount or less, and stopping light exposure in the case where the difference exceeds said predetermined amount.

14. A method of vibration isolation in a camera, comprising:

correcting a camera movement with a correcting optical unit;

calculating a drive target value of said camera movement correcting optical unit based on a camera movement signal;

computing a light exposure amount; and continuing exposure using exposure amount control means, even if said drive target value exceeds a drive threshold amount of said camera movement correcting optical unit during the exposure operation, until it reaches the light exposure amount computed, in the case where a difference between said drive target value and said drive threshold amount is a predetermined amount or less, and stopping light exposure in the case where predetermined time elapses after the difference exceeded the predetermined amount.

* * * * *